(12) United States Patent
Nishikawa

(10) Patent No.: US 8,093,865 B2
(45) Date of Patent: Jan. 10, 2012

(54) CHARGING DEVICE WITH BACKFLOW PREVENTION

(75) Inventor: Tsutomu Nishikawa, Chigasaki (JP)

(73) Assignee: Canon Kabushiki Kaisha (JP)

( * ) Notice: Subject to any disclaimer, the term of this patent is extended or adjusted under 35 U.S.C. 154(b) by 848 days.

(21) Appl. No.: 12/163,456

(22) Filed: Jun. 27, 2008

(65) Prior Publication Data

US 2009/0009142 A1    Jan. 8, 2009

(30) Foreign Application Priority Data

Jul. 3, 2007  (JP) .................................. 2007-175168

(51) Int. Cl.
*H01M 10/46*  (2006.01)
(52) U.S. Cl. ........................................... 320/134
(58) Field of Classification Search .................. 320/107, 320/114, 134, 136, 149, DIG. 15
See application file for complete search history.

(56) References Cited

U.S. PATENT DOCUMENTS

| | | | |
|---|---|---|---|
| 7,423,471 B2 * | 9/2008 | Ueda | 327/309 |
| 2007/0139836 A1 * | 6/2007 | Ueda | 361/82 |
| 2007/0177410 A1 * | 8/2007 | Nakamura et al. | 363/21.06 |

FOREIGN PATENT DOCUMENTS

JP    2005-224016 A    8/2005

\* cited by examiner

*Primary Examiner* — Edward Tso

(74) *Attorney, Agent, or Firm* — Rossi, Kimms & McDowell LLP

(57) ABSTRACT

A charging device which is capable of preventing charging current from flowing even if a battery pack remains mounted thereon after charging of the battery pack is completed, thereby preventing deterioration of batteries of the battery pack. A circuit including a semiconductor switch generates a DC power for charging the battery pack. A backflow prevention diode is connected between the semiconductor switch and the battery pack. When charging of the battery pack has been completed, a secondary charge control circuit causes a DC voltage input to the backflow prevention diode to be made lower than the voltage of the battery pack.

5 Claims, 7 Drawing Sheets

CHARGING DEVICE WITH BACKFLOW PREVENTION

BACKGROUND OF THE INVENTION

1. Field of the Invention

The present invention relates to a charging device, and more particularly to a charging device that charges a battery pack which can be mounted on an electronic device for supplying electric power to the electronic device.

2. Description of the Related Art

Recently, there is such a situation that electronic devices, such as digital cameras and cellular phones, can be purchased at low prices, and the number of users thereof increases. Accordingly, an increasing number of users own a plurality of charging devices for charging battery packs compatible with the respective associated electronic devices. This increases users who keep battery packs mounted on charging devices, and hence new charging devices have been proposed which are intended for prolonging the service life of the battery packs and saving of energy.

For example, for a method of charging a secondary battery using an output from a power supply circuit, there has been proposed a technique in which the voltage of the battery or the temperature of the battery is detected, and the operation of the power supply circuit is stopped when it is determined that the battery is fully charged, followed by terminating charging of the battery (see e.g. Japanese Patent Laid-Open Publication No. 2005-224016). In this technique, with a view to reduction of stand-by power of the charging device, there is provided a function (latching function) of completely stopping the ON/OFF operation of a switching element that controls supply of DC current to a primary control circuit of the charging device. Further, there is also proposed a method of terminating charging of the battery by a timer.

However, in the above-mentioned conventional technique disclosed in Japanese Patent Laid-Open Publication No. 2005-224016, since the latching function of completely stopping the ON/OFF operation of the switching element that controls supply of DC current to the primary control circuit of the charging device is used, it is required to pull out an AC plug of the charging device from an AC outlet, and then insert the AC plug again into the AC outlet. Further, the method of terminating a charging operation using a timer can cause overcharging of the battery though it can fully charge the battery.

SUMMARY OF THE INVENTION

The present invention provides a charging device which is capable of preventing a charging current from flowing even if a battery pack remains mounted thereon after charging of the battery pack is completed, thereby preventing deterioration of batteries of the battery pack.

The present invention provides a charging device that charges a battery connected thereto, comprising a DC power generation unit configured to generate a DC power for charging the battery, a backflow prevention unit connected between the DC power generation unit and the battery, and a control unit configured to control a DC voltage input to the backflow prevention unit such that the DC voltage input to the backflow prevention unit becomes lower than a voltage of the battery when charging of the battery has been completed.

According to the present invention, it is possible to prevent the charging current from flowing even if the battery pack remains mounted on the charging device after charging of the battery pack is completed, thereby preventing deterioration of batteries of the battery pack.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing embodiments thereof.

Figure 1:
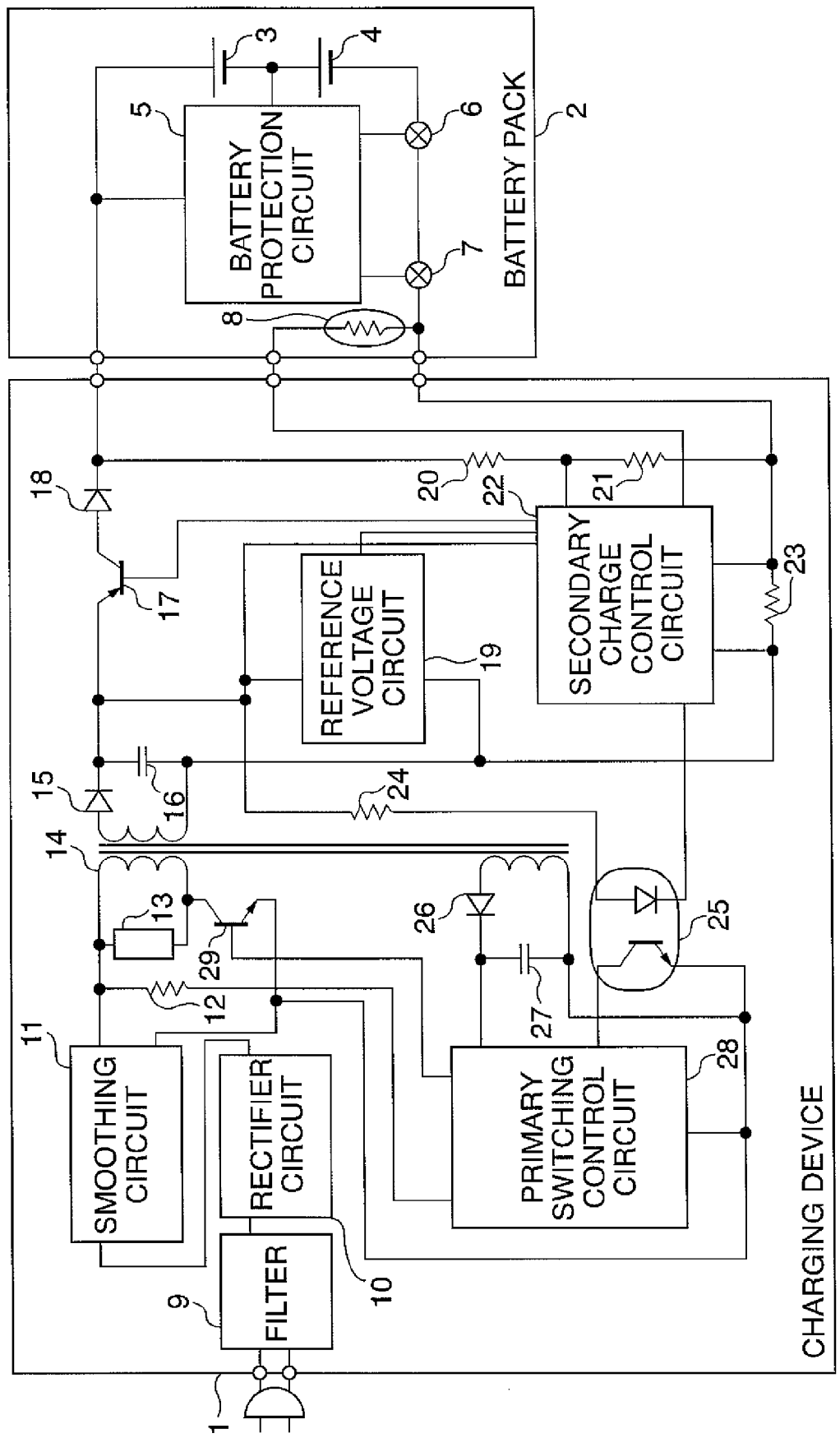
FIG. 1 is a schematic diagram of the circuit configuration of a charging device according to a first embodiment of the present invention and a battery pack that can be mounted on the charging device.

FIG. 1 is a schematic diagram of the circuit configuration of a charging device according to a first embodiment of the present invention and a battery pack that can be mounted on the charging device.

First, a description will be given of the battery pack.

The battery pack 2 is configured to be attachable to and detachable from the charging device 1 that performs constant voltage/constant current charging, and is comprised of lithium ion secondary battery cells 3 and 4, a battery protection circuit 5, semiconductor switches 6 and 7, and a thermistor 8.

The lithium ion secondary battery cells 3 and 4 are lithium ion secondary batteries which have the same characteristics and the same capacity, and are connected in series to each other. The battery protection circuit 5 performs on/off control of the semiconductor switches 6 and 7, and always monitor the lithium ion secondary battery cells 3 and 4 and the battery pack 2 so as to prevent overdischarge and overvoltage charge of the lithium ion secondary battery cells 3 and 4, and overcurrent discharge of the battery pack 2. The thermistor 8 detects heat generated by the semiconductor switches 6 and 7 and the lithium ion secondary battery cells 3 and 4.

The battery pack 2 is configured to be also attachable to and detachable from an electronic device (not shown), such as a digital camera or a PDA (Personal Digital Assistant), and functions as a power supply for the electronic device.

Next, a description will be given of the charging device.

The charging device 1 is comprised of a positive electrode terminal connected to a positive electrode of the battery pack 2, a negative electrode terminal connected to a negative electrode of the battery pack 2, and a temperature terminal connected to the thermistor 8. Further, the charging device 1 is connected to an external AC (Alternating Current) power supply, and converts AC power from the AC power supply to DC (Direct Current) power by rectifying the AC power with a filter 9, a rectifier circuit 10, and a smoothing circuit 11.

The DC power output from the smoothing circuit 11 is applied to a primary switching control circuit 28 via a resistor 12. The primary switching control circuit 28 performs switching control of a semiconductor switch 29 connected to a primary coil of a transformer 14. The DC power output from the smoothing circuit 11 is applied to the primary coil of the transformer 14, and an electromotive force (induced power) is generated in a secondary coil of the transformer 14 by switching of the semiconductor switch 29.

A snubber circuit 13 is for preventing the semiconductor switch 29 from being damaged by an overvoltage generated in the primary coil of the transformer 14. The transformer 14 is for transforming the DC power, and the primary coil and secondary coil thereof are insulated from each other so as to prevent the AC power from leaking to the output of the charging device 1. A rectifier diode 15 and a smoothing capacitor 16 generate a DC power necessary for charging and control by a secondary circuit, from the electromotive force (induced power) generated in the secondary coil of the transformer 14. The DC power generated for the secondary circuit is applied to a reference voltage circuit 19 and a secondary charge control circuit 22, for activating these circuits 19 and 22.

When the battery pack 2 is mounted on the charging device 1, the secondary charge control circuit 22 detects connection between the charging device 1 and the thermistor 8 to turn on a semiconductor switch 17, whereby the generated DC power is supplied to the battery pack 2 via a backflow prevention diode 18 connected to the semiconductor switch 17. The backflow prevention diode 18 (backflow prevention unit) is disposed so as to prevent a backflow current from flowing from the battery pack 2. In the present embodiment, a circuit from the filter 9 to the semiconductor switch 17 corresponds to a DC power generation unit.

Resistors 20 and 21 provide a divided voltage obtained by dividing a charging voltage applied to the battery pack 2. The charging voltage is monitored by the secondary charge control circuit 22. The secondary charge control circuit 22 monitors a charging current supplied to the battery pack 2 by detecting a voltage across a resistor 23. The secondary charge control circuit 22 determines a charged state of the battery pack 2 based on the charging voltage and the charging current to control a photocoupler 25.

Further, the secondary charge control circuit 22 feedback-controls the photocoupler 25 and the primary switching control circuit 28 to thereby control the charging voltage such that it becomes the lowest voltage necessary for the secondary circuit. Further, the secondary charge control circuit 22 is connected to an indicator (not shown) formed by an LED, and causes the charged state of the battery pack 2 to be indicated by flickering or lighting of the LED.

The photocoupler 25 is comprised of a photodiode and a phototransistor, and feeds back a control signal to the primary circuit such that the DC power required by the secondary circuit is generated, while insulating between the primary circuit and the secondary circuit. The photodiode in the photocoupler 25 obtains a DC power via a resistor 24. This DC power is increased or decreased by the secondary charge control circuit 22, whereby the photodiode emits light with a varying degree of intensity. The phototransistor in the photocoupler 25 has an impedance varied according to the degree of intensity of light, and changes the pulse width of a signal generated by the primary switching control circuit 28 based on the light emitted from the photodiode.

The primary switching control circuit 28 obtains an activation voltage thereof via the resistor 12 and thereafter continues to operate using a DC power obtained from a tertiary coil of the transformer 14, via a rectifier diode 26 and a smoothing capacitor 27. The DC power obtained by the rectifier diode 26 and the smoothing capacitor 27 is also used as a voltage for detecting an overvoltage when an excessive load is applied to the secondary-side circuit.

With the charging circuit configured as above, the pulse width of the signal generated in the primary switching control circuit 28 is feedback-controlled by the secondary charge control circuit 22, and is controlled via the photocoupler 25.

Whether the charging of the battery pack 2 has been completed is determined from changes in the charging voltage and the charging current. When the charging voltage is not lower than a predetermined voltage value and the charging current is not higher than a predetermined current value, the secondary charge control circuit 22 determines that the charging of the battery pack 2 has been completed. Upon determining that the charging of the battery pack 2 has been completed, the secondary charge control circuit 22 turns off the semiconductor switch 17, and feedback-controls the primary switching control circuit 28 via the photocoupler 25 such that a DC voltage Vps applied to the semiconductor switch 17 is lowered. Thus, a voltage Vin on the input side of the backflow prevention diode 18 is lowered to a predetermined voltage value Va.

Even when the charging of the battery pack 2 has been completed and the semiconductor switch 17 is turned off, actually, this state is equivalent to a state in which a resistance of approximately 100 KΩ is connected in place of the semiconductor switch 17. In the conventional charging device, if a DC voltage applied to the semiconductor switch 17 and the battery voltage of the battery pack 2 are different, the battery pack 2 continues to be charged although a charging current becomes lower, unless the battery pack 2 is removed from the charging device 1.

To prevent the battery pack 2 from continuing to be charged after completion of charging as described above, there has been proposed a method of separating associated contacts of the battery pack 2 and the charging device 1 using a mechanical electromagnetic relay in place of the semiconductor switch 17. In this case, it is necessary to take the chattering and durability of the contacts into account, and hence a countermeasure circuit for preventing chattering and improving durability is required.

In general, in the battery pack 2 configured as illustrated in FIG. 1, an overvoltage protection operation is performed to cut off the charging current when overvoltage occurs. Further, for protection of the lithium ion secondary battery cells 3 and 4 of the battery pack 2 when pressure in the battery cells abnormally rises, the battery cells 3 and 4 each incorporate an electric current cutoff valve mechanism. In the conventional charging device, when the overvoltage protection operation is being performed or the electric current cutoff valve mechanisms of the battery cells are in operation, no charging current flows in the battery pack, and the battery pack does not exhibit an open-circuit voltage, and therefore it is determined that the battery pack 2 is in the same state as the charging completed state thereof.

In the charging device according to the present embodiment, in the charging completed state, the voltage Vin on the input side of the backflow prevention diode 18 is made lower than a battery voltage Vbp, whereby it is possible to prevent the battery pack 2 from being charged after completion of charging, thereby making it possible to stop or complete the charging more safely and reliably.

Figure 2:
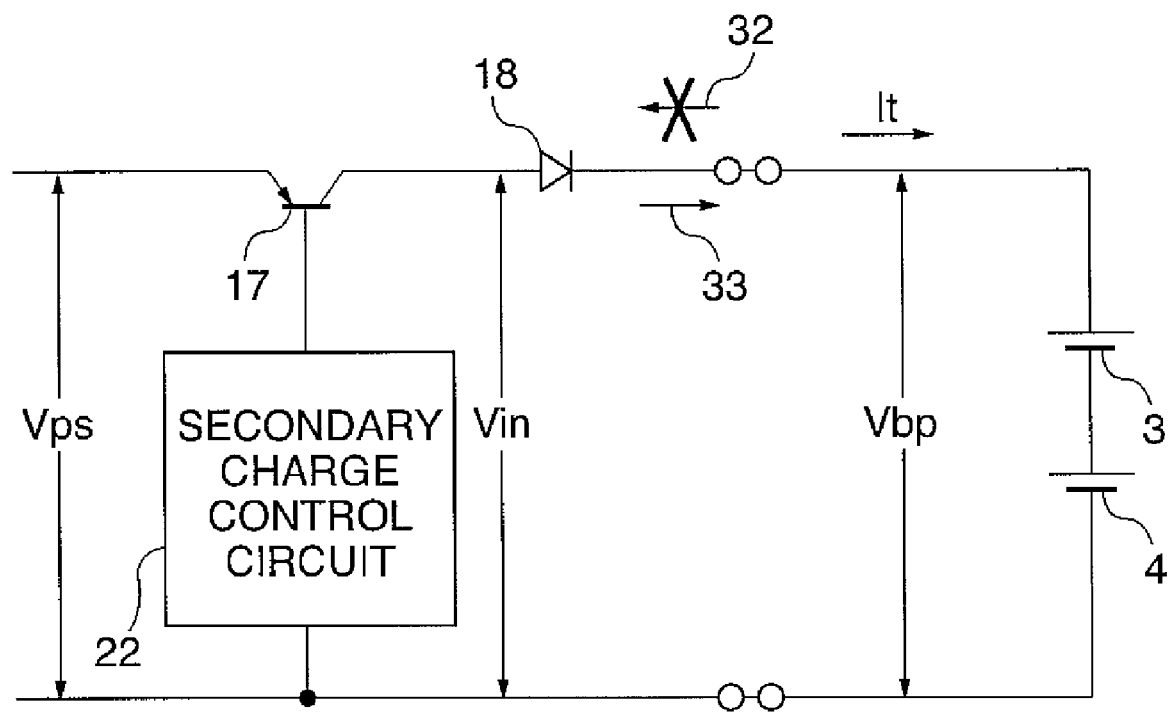
FIG. 2 is a diagram useful in explaining an operation for causing an input voltage of the charging device after completion of charging of the battery pack to be made lower than a battery voltage obtained when the battery pack is fully charged.

FIG. 2 is a diagram useful in explaining an operation for causing the input voltage of the charging device 1 after completion of charging of the battery pack 2 to be made lower than the battery voltage obtained when the battery pack 2 is fully charged.

In FIG. 2, Vbp denotes the battery voltage of the lithium ion secondary battery cells 3 and 4 connected in series in the battery pack 2, which is also an open-circuit voltage of the battery pack 2. Vin denotes an input voltage to the backflow prevention diode 18 when a charging current is flowing, i.e. when an electric current is flowing in a direction indicated by an arrow 33. Vps denotes a voltage necessary for supplying the input voltage Vin, which is low when the semiconductor switch 17 is on, and becomes the minimum voltage necessary for the operation of the secondary charge control circuit 22 when the semiconductor switch 17 is off. The difference between the battery voltage Vbp and the input voltage Vin is equal to a voltage across the backflow prevention diode 18 in a normal direction.

An arrow 32 with a cross indicates a flowing direction of a backflow current after completion of the charging of the battery pack 2, but also indicates that the backflow prevention diode 18 prevents flow of the backflow current from the lithium ion secondary battery cells 3 and 4. The state in which the backflow current is prevented from flowing by the backflow prevention diode 18 is a state in which the semiconductor switch 17 is in off, and at the same time when the input voltage Vin is lower than the battery voltage Vbp. At this time, the battery voltage Vbp is a voltage between opposite ends of the lithium ion secondary battery cells 3 and 4 connected in series, i.e. the open-circuit voltage of the battery pack 2, which is generally lower than a charging voltage during charging of the battery pack 2.

Figure 3:
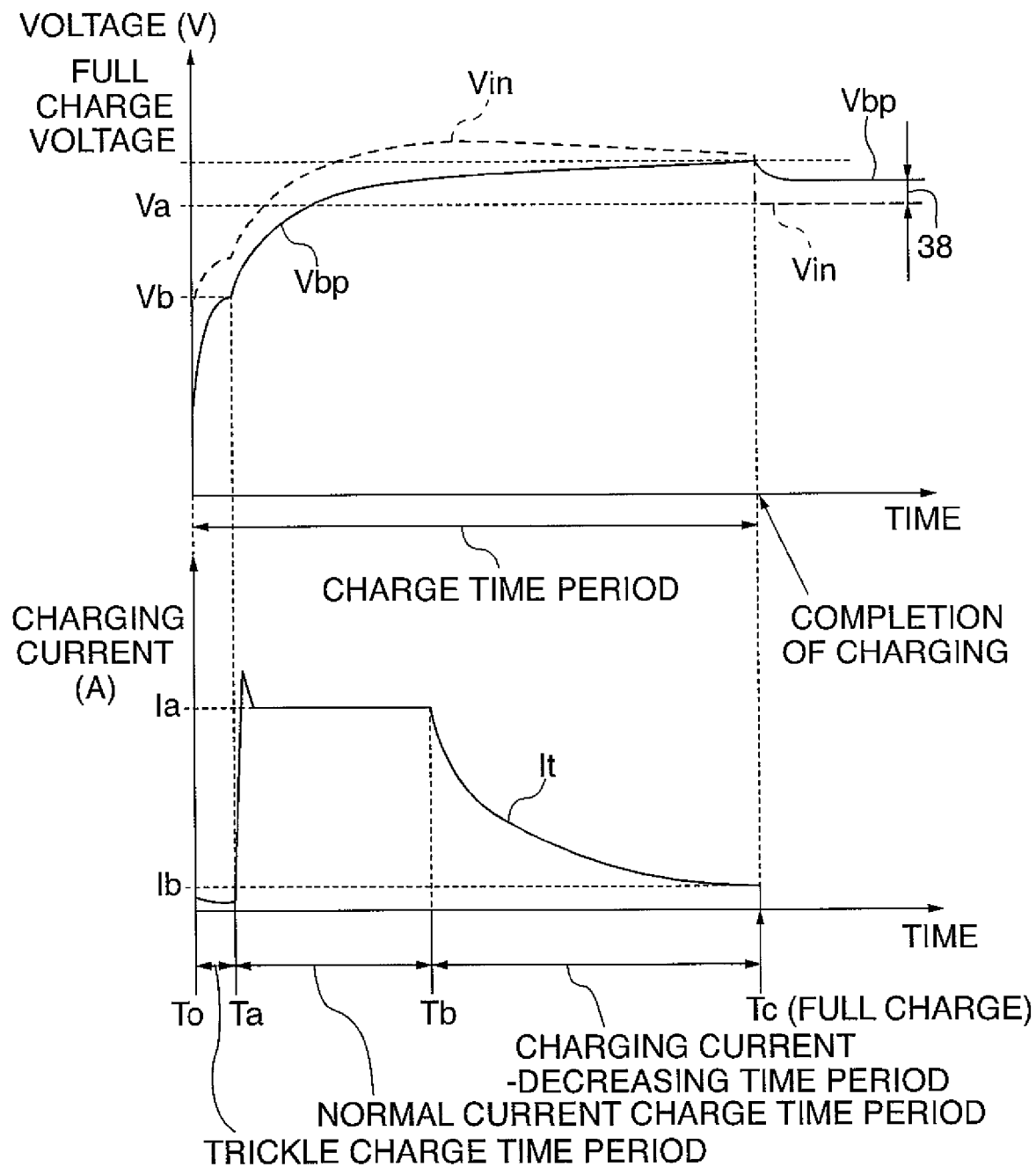
FIG. 3 is a diagram showing changes in voltage and a charging current in the charging device during charging of the battery pack.

FIG. 3 is a diagram showing changes in the voltage and the charging current in the charging device 1 during charging of the battery pack.

Referring to FIG. 3, an upper graph shows changes with time in the input voltage Vin and the battery voltage Vbp during charging of the battery pack, and a lower graph shows changes with time in a charging current It during the charging.

In FIG. 3, To denotes a time point when the charging is started, and a time period between time points To and Ta denotes a trickle charge time period over which trickle charge is performed. The trickle charge time period refers to a time period over which the battery pack is charged by a very small charging current It until the battery voltage Vbp becomes equal to the predetermined voltage value Vb. The very small charging current flowing during the trickle charge time period is an electric current having a value not larger than a value 0.2 times as large as the discharge current (for example, in the case where the capacity of the battery pack 2 is 1000 [mAh], if the discharge time for full discharge is one hour, the very small charging current is not larger than 0.2 times the discharge current (1000 [mA]) in this case, i.e. 200 [mA]).

When the battery voltage Vbp reaches the predetermined voltage value Vb, the charging current is increased to a value Ia so as to further charge the battery pack. A time period between the time point Ta and a time point Tb is referred to as "the normal current charge time period". During the normal current charge time period, the battery pack is charged by the charging current It set to a fixed current value Ia.

After the time point Tb, the battery pack is charged by a charging voltage limited to a full charge voltage, so that an amount of lithium ions moving within the battery cells is reduced to progressively reduce the charging current It. A time period between the time point Tb and a time point Tc is referred to as "the charging current decreasing time period". The charge time period is from the time point To the time point Tc, over which the battery voltage Vbp rises, causing the battery pack to be more charged.

Vin denotes the DC voltage on the input side of the backflow prevention diode 18. The DC voltage Vin is made higher than the battery voltage Vbp by a voltage across the backflow prevention diode 18 in the normal direction. However, at the time point Tc, the charging of the battery pack has been almost completed, whereby the charging current It is reduced to a predetermined current value Ib, and the voltage of the backflow prevention diode 18 in the normal direction is also reduced to make the battery voltage Vbp equal to the input voltage Vin, i.e. make the battery voltage Vbp equal to the full charge voltage.

In the conventional charging device, the input voltage Vin is not reduced to the predetermined voltage value Va even after completion of the charging, and hence even when the semiconductor switch 17 is turned off, actually, this state is equivalent to a state in which a resistance of approximately 100 KΩ is connected in place of the semiconductor switch 17. In other words, there is a difference between the input voltage Vin and the battery voltage Vbp, and the charging current is only reduced to be very small. Therefore, if the battery pack continues to be connected to the charging device after completion of the charging thereof, the fully charged battery pack is further charged, which can cause decomposition of electrolyte due to a high potential within the batteries. Further, when the ambient temperature is high (e.g. not lower than 45° C.), the decomposition of electrolyte is more liable to occur, which can cause irreversible deterioration of the battery capacity and a rise in the pressure in the batteries.

In the charging device according to the present embodiment, after the time point Tc when the charging of the battery pack is completed (the battery pack is fully charged), the input voltage Vin is reduced to the predetermined voltage value Va to secure a potential difference 38 between the input voltage Vin and the battery voltage Vbp. By reducing the input voltage Vin to the predetermined voltage value Va, it is possible to eliminate the charging current It, thereby making it possible to prevent deterioration of the batteries of the battery pack even in a state in which the battery pack remains mounted on the charging device after completion of the charging of the battery pack.

Figure 4:
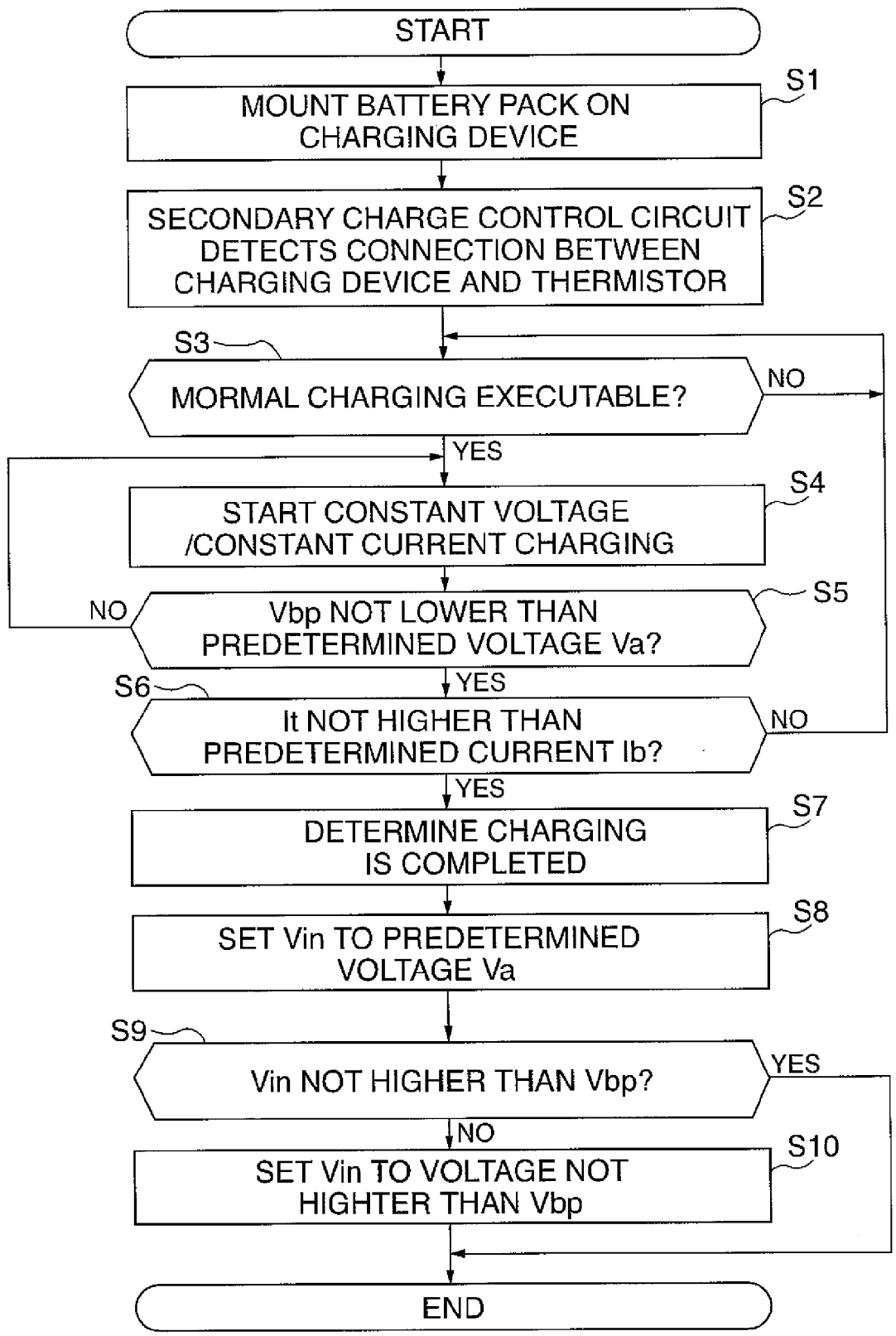
FIG. 4 is a flowchart of a charging process executed by the charging device.

FIG. 4 is a flowchart of a charging process executed by the charging device 1.

Referring to FIG. 4, when the battery pack 2 is mounted on the charging device 1 (step S1), the secondary charge control circuit 22 detects connection between the charging device 1 and the thermistor 8 within the battery pack 2 (step S2).

Next, in a step S3, the above-mentioned trickle charge for charging the battery pack by a small charging current is performed, and it is determined whether or not normal current charging, which is constant voltage/constant current charging, can be executed. When it is impossible to execute the normal current charging, the present step is repeatedly carried out until the trickle charge is completed. On the other hand, when it becomes possible to execute the normal current charging, the constant voltage/constant current charging is started as the normal current charging (step S4).

In a step S5, when the battery voltage Vbp is lower than the predetermined voltage value Va, the process returns to the step S4, whereas when the battery voltage Vbp has become not lower than the predetermined voltage value Va, the process proceeds to a step S6. In the step S6, when the charging current It exceeds a predetermined current Ib, the process returns to the step S3, whereas when the charging current It is not higher than the predetermined current Ib, the process proceeds to a step S7, wherein the charging process is determined to be completed.

In a step S8, the semiconductor switch 17 is turned off, and the primary switching control circuit 28 is feedback-controlled to reduce the voltage Vps, whereby the input voltage Vin is set to the predetermined voltage value Va. In a step S9, it is determined whether or not the input voltage Vin is not higher than the battery voltage Vbp. If the input voltage Vin is higher than the battery voltage Vbp, the input voltage Vin is made not higher than the battery voltage Vbp (step S10), followed by terminating the present process. On the other hand, in the step S9, if the input voltage Vin is not higher than the battery voltage Vbp, the present process is immediately terminated.

According to the above-described first embodiment, when the charging of the battery pack 2 has been completed, the secondary charge control circuit 22 turns off the semiconductor switch 17, and feedback-controls the primary switching control circuit 28 so as to reduce the voltage on the input side of the semiconductor switch 17. This makes it possible to prevent the deterioration of the batteries of the battery pack even when the battery pack remains mounted on the charging device after completion of the charging of the battery pack.

Figure 5:
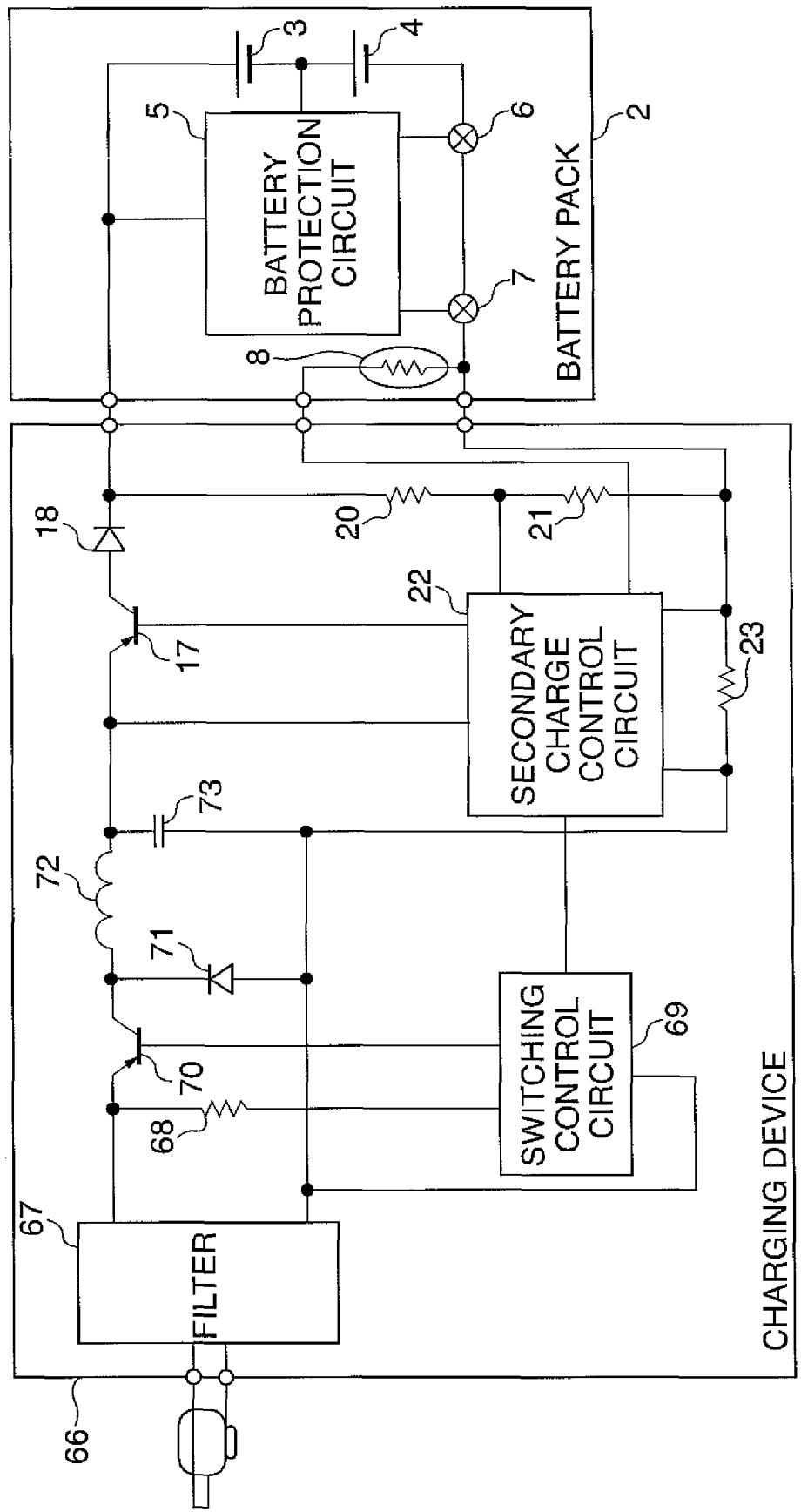
FIG. 5 is a schematic diagram of the circuit configuration of a charging device according to a second embodiment of the present invention and a battery pack that can be mounted on the charging device.

FIG. 5 is a schematic diagram of the circuit configuration of a charging device according to a second embodiment of the present invention and a battery pack that can be mounted on the charging device. It should be noted that component elements identical to those in the above-described first embodiment are designated by identical reference numerals, and detailed description thereof is omitted.

Referring to FIG. 5, similarly to the charging device 1, the charging device 66 is configured to be capable of mounting the battery pack 2, but it has a DC power supplied from a DC power supply, such as a car battery, in place of the AC power supply.

In a charging circuit of the charging device 66, when a switching control circuit 69 is activated by the DC power supplied via a filter 67 and a resistor 68, the switching control circuit 69 causes a semiconductor switch 70 to perform switching. When the semiconductor switch 70 performs switching, voltage conversion is performed by a rectifier circuit 71 and an excitation coil 72, and a DC power having a voltage Vps necessary for charging the battery pack 2 is generated by a smoothing capacitor 73. The voltage Vps is a DC voltage applied to the semiconductor switch 17. The secondary charge control circuit 22 is activated by the DC power having the voltage Vps.

When the battery pack 2 is mounted on the charging device 66, the secondary charge control circuit 22 detects connection between the charging device 66 and the thermistor 8 to turn on the semiconductor switch 17, whereby the DC power is supplied to the battery pack 2 via the backflow prevention diode 18 connected to the semiconductor switch 17. In the present embodiment, a circuit from the filter 67 to the semiconductor switch 17 corresponds to the DC power generation unit.

The resistors 20 and 21 provide a divided voltage obtained by dividing a charging voltage applied to the battery pack 2. This divided voltage is monitored by the secondary charge control circuit 22. The secondary charge control circuit 22 monitors a charging current supplied to the battery pack 2 by detecting a voltage across the resistor 23. The secondary charge control circuit 22 determines a charged state of the battery pack 2 based on the charging voltage and the charging current, to thereby change the pulse width of a signal fed back to the switching control circuit 69. Further, the secondary charge control circuit 22 is connected to an indicator (not shown) formed by an LED, and causes the charged state of the battery pack 2 to be indicated by flickering or lighting of the LED.

Whether the charging of the battery pack 2 has been completed is determined from changes in the charging voltage and the charging current. When the charging voltage becomes is not lower than a predetermined voltage value and the charging current is not higher than a predetermined current value, the secondary charge control circuit 22 determines that the charging of the battery pack 2 has been completed. Upon determining that the charging of the battery pack 2 has been completed, the secondary charge control circuit 22 turns off the semiconductor switch 17, and feedback-controls the switching control circuit 69 such that the DC voltage Vps applied to the semiconductor switch 17 is lowered. Thus, the voltage Vin on the input side of the backflow prevention diode 18 is reduced to the predetermined voltage value Va. The secondary charge control circuit 22 controls the switching control circuit 69 to control the DC voltage Vps to the minimum required voltage.

According to the above-described second embodiment, when the charging of the battery pack 2 has been completed, the secondary charge control circuit 22 feedback-controls the switching control circuit 69 so as to reduce the voltage on the input side of the backflow prevention diode 18. This makes it possible not only to obtain the same advantageous effects as provided by the above-described first embodiment but also to suppress a stand-by power of the charging device 66.

Figure 6:
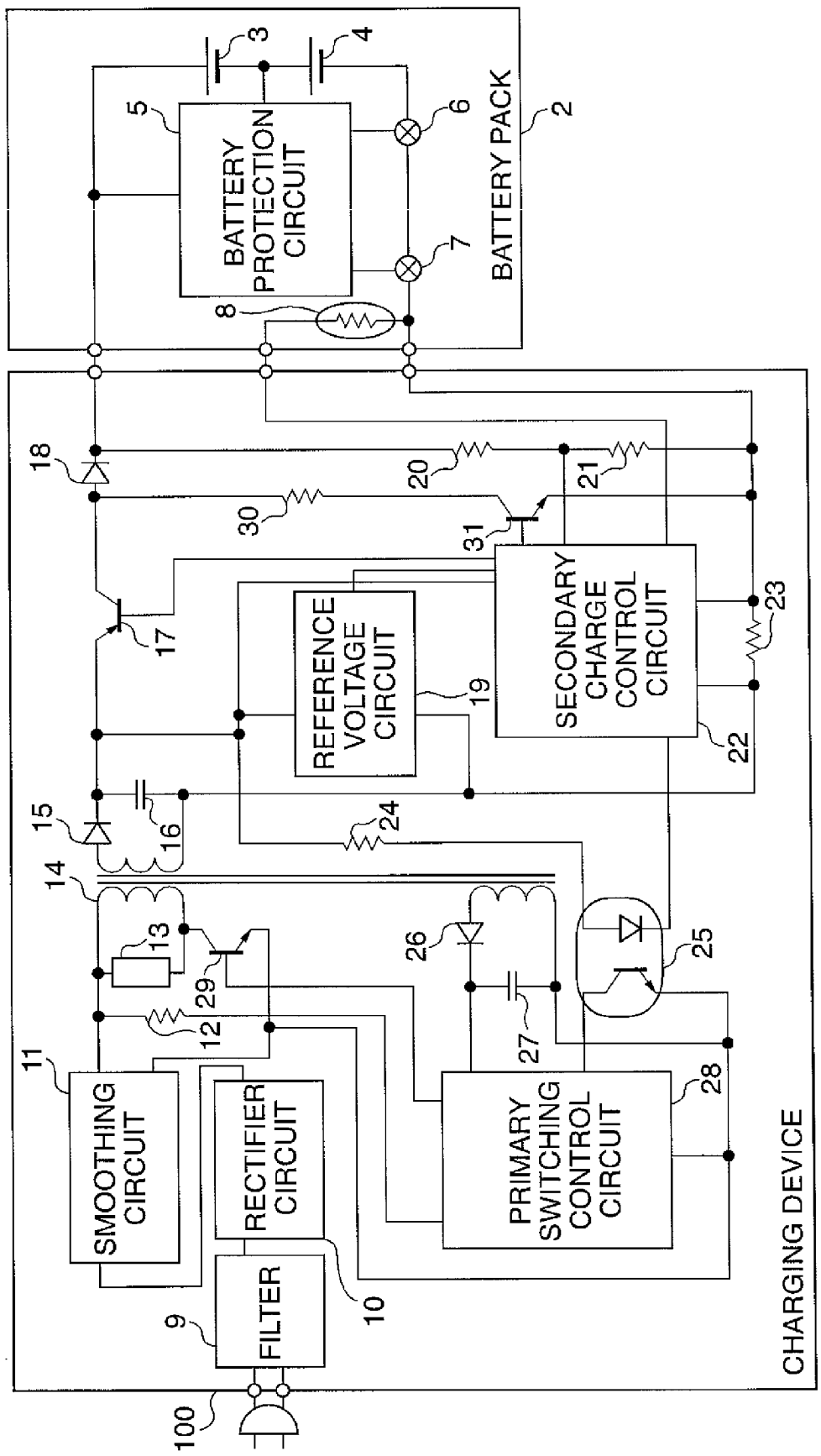
FIG. 6 is a schematic diagram of the circuit configuration of charging device according to a third embodiment of the present invention and a battery pack that can be mounted on the charging device.

FIG. 6 is a schematic diagram of the circuit configuration of a charging device according to a third embodiment of the present invention and a battery pack that can be mounted on the charging device. It should be noted that component elements identical to those in the above-described first and second embodiments are designated by identical reference numerals, and detailed description thereof is omitted.

As shown in FIG. 6, the charging device 100 has a charging circuit configuration formed by adding a series circuit formed by a resistor 30 and a semiconductor switch 31 to the charging device 1. The series circuit formed by the resistor 30 and the semiconductor switch 31 is disposed between a connecting point between the semiconductor switch 17 and the backflow prevention diode 18, and a line connected to the negative electrode of the battery pack 2.

In the charging device according to the present embodiment, an operation for causing the input voltage Vin to be made lower than the battery voltage Vbp obtained when the battery pack 2 is fully charged is performed by the series circuit formed by the resistor 30 and the semiconductor switch 31.

Upon determining that the charging of the battery pack 2 has been completed, the secondary charge control circuit 22 turns off the semiconductor switch 17. Then, the secondary charge control circuit 22 turns on the semiconductor switch 31, whereby the resistor 30 makes the input voltage Vin at the connecting point between the semiconductor switch 17 and the backflow prevention diode 18 lower than the battery voltage Vbp of the battery pack 2. Thus, the secondary charge control circuit 22 prevents the battery pack 2 from being overcharged.

An amount of reduction of the input voltage Vin is determined by a dividing ratio between a high impedance of the semiconductor switch 17 when it is off and the resistance value of the resistor 30.

According to the above-described third embodiment, by adding the series circuit formed by the resistor 30 and the semiconductor switch 31 to the charging device which charges the battery pack by the conventional AC power supply, it is possible to obtain the same advantageous effects as provided by the above-described first embodiment.

Figure 7:
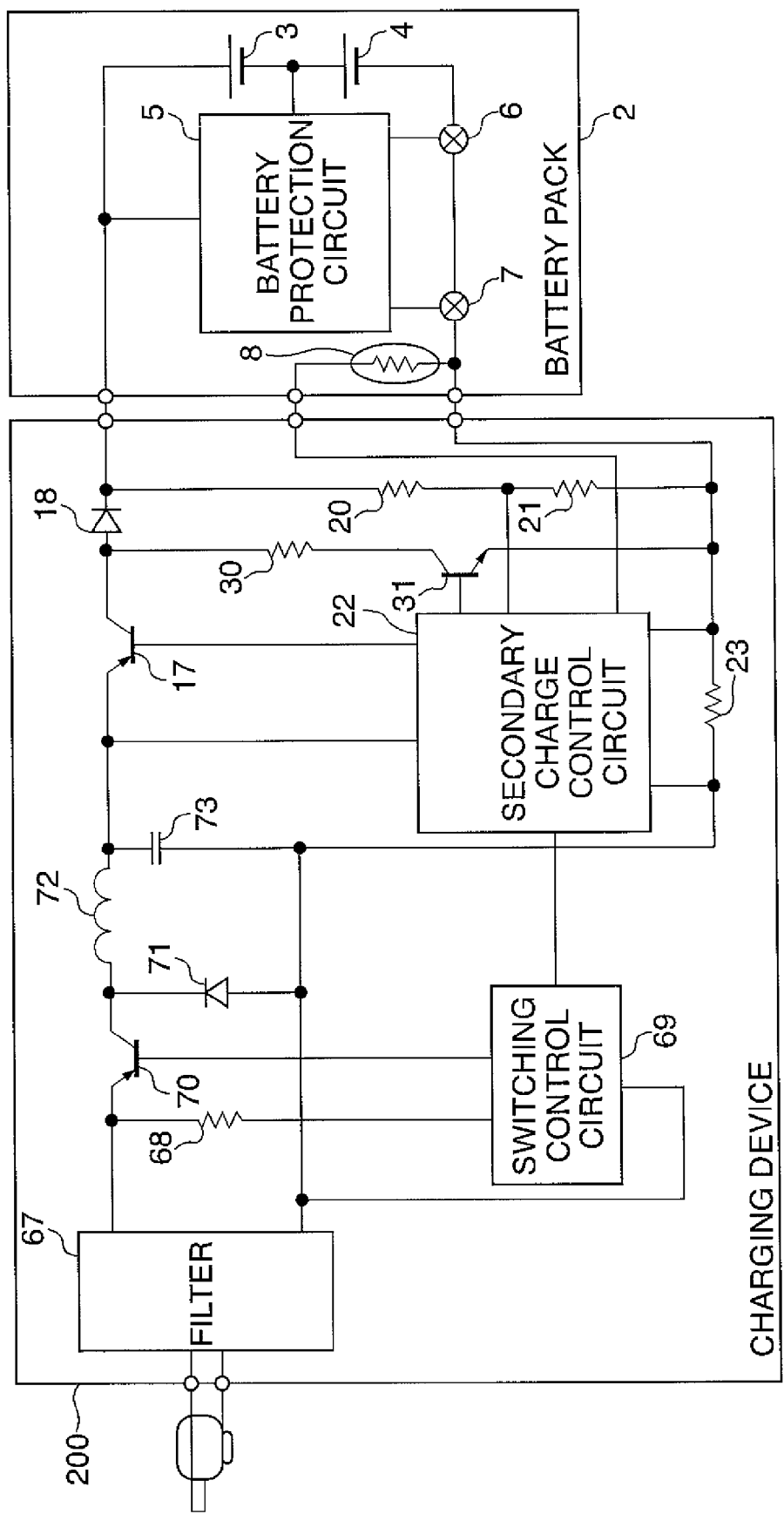
FIG. 7 is a schematic diagram of the circuit configuration of a charging device according to a fourth embodiment of the present invention and a battery pack that can be mounted on the charging device.

FIG. 7 is a schematic diagram of the circuit configuration of a charging device according to a fourth embodiment of the present invention and a battery pack that can be mounted on the charging device. It should be noted that component elements identical to those in the above-described first to third embodiments are designated by identical reference numerals, and detailed description thereof is omitted.

The charging device 200 is connected to a DC power supply, such as a car battery, and is supplied with a DC power from the DC power supply. As shown in FIG. 7, the charging device 200 has a charging circuit configuration formed by adding the series circuit formed by the resistor 30 and the semiconductor switch 31 to the charging device 66. The series circuit formed by the resistor 30 and the semiconductor switch 31 is disposed between the connecting point between the semiconductor switch 17 and the backflow prevention diode 18, and the line connected to the negative electrode of the battery pack 2.

In the present embodiment, the operation for causing the input voltage Vin to be made lower than the battery voltage Vbp obtained when the battery pack 2 is fully charged is performed by the resistor 30 and the semiconductor switch 31.

When the secondary charge control circuit 22 determines that the charging of the battery pack 2 has been completed, the secondary charge control circuit 22 turns off the semiconductor switch 17. Then, the secondary charge control circuit 22 turns on the semiconductor switch 31, whereby the resistor 30 makes the input voltage Vin at the connecting point between the semiconductor switch 17 and the backflow prevention diode 18 lower than the battery voltage Vbp of the battery pack 2. Thus, the secondary charge control circuit 22 prevents the battery pack 2 from being overcharged.

An amount of reduction of the input voltage Vin is determined by a dividing ratio between a high impedance of the semiconductor switch 17 when it is off and a resistance value of the resistor 30.

According to the above-described fourth embodiment, by adding the series circuit formed by the resistor 30 and the semiconductor switch 31 to the charging device which charges the battery pack by the conventional DC power supply, it is possible to obtain the same advantageous effects as provided by the above-described first embodiment.

The same advantageous effects can be obtained also when the semiconductor switch 17 and the backflow prevention diode 18, described heretofore in each of the above-mentioned embodiments, are formed by electronic elements including parasitic diodes, such as FETs. Further, although in the above-described third and fourth embodiments, the ON/OFF control of the semiconductor switch 31 is carried out by an output terminal of the secondary charge control circuit 22 other than the output terminal of the same for controlling the semiconductor switch 17, this is not limitative, but the semiconductor switch 31 may be configured to be controlled together with the semiconductor switch 17 by using the control output of the secondary charge control circuit 22 for controlling the semiconductor switch 17.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-175168 filed Jul. 3, 2007, which is hereby incorporated by reference herein in its entirety.

What is claimed is:

1. A charging device that charges a battery, comprising:
a transformer that generates a DC power for charging the battery;
a backflow prevention unit that is connected between the transformer and the battery; and
a control unit that changes an input voltage of the backflow prevention unit to a predetermined voltage by switching a primary coil included in the transformer if charging of the battery is not performed, wherein the predetermined voltage is not higher than a voltage of the battery.

2. The charging device according to claim 1, comprising: a switch that is connected between the transformer and the backflow prevention unit, and
wherein if charging of the battery is not performed, the control unit changes the input voltage to the predetermined voltage by turning off the switch.

3. The charging device according to claim 1, wherein if charging of the battery is not performed, the control unit changes the input voltage to the predetermined voltage by connecting between an input side of the backflow prevention unit and a line connected to a negative electrode of the battery.

4. The charging device according to claim 1, wherein the control unit detects whether or not charging of the battery is performed based on a current supplied to the battery and a voltage supplied to the battery.

5. The charging device according to claim 1, wherein if charging of the battery is finished, the control unit changes the input voltage to the predetermined voltage by switching the primary coil.

* * * * *